(12) United States Patent
Iwama et al.

(10) Patent No.: US 10,629,237 B2
(45) Date of Patent: Apr. 21, 2020

(54) MAGNET STRUCTURE, CLAMPING MECHANISM, AND OPTICAL DISC APPARATUS

(71) Applicant: JVC KENWOOD Corporation, Yokohama-shi, Kanagawa (JP)

(72) Inventors: Shigehiko Iwama, Yokohama (JP); Makoto Itonaga, Yokohama (JP); Yuichi Hasegawa, Yokohama (JP); Koji Tsujita, Yokohama (JP); Masayuki Ono, Yokohama (JP); Katsue Horikoshi, Yokohama (JP)

(73) Assignee: JVC KENWOOD CORPORATION, Yokohama-Shi, Kanagawa (JP)

( * ) Notice: Subject to any disclaimer, the term of this patent is extended or adjusted under 35 U.S.C. 154(b) by 0 days.

(21) Appl. No.: 16/294,196

(22) Filed: Mar. 6, 2019

(65) Prior Publication Data

US 2019/0206435 A1 Jul. 4, 2019

Related U.S. Application Data

(63) Continuation of application No. PCT/JP2017/022779, filed on Jun. 21, 2017.

(30) Foreign Application Priority Data

Sep. 15, 2016 (JP) ................. 2016-180350

(51) Int. Cl.
*G11B 17/028* (2006.01)
*H01F 7/04* (2006.01)

(52) U.S. Cl.
CPC ........ *G11B 17/0284* (2013.01); *G11B 17/028* (2013.01); *H01F 7/04* (2013.01)

(58) Field of Classification Search
None
See application file for complete search history.

(56) References Cited

FOREIGN PATENT DOCUMENTS

JP 6110214 A 1/1986
JP 61153160 A 7/1986
(Continued)

OTHER PUBLICATIONS

PCT Translation of PCT/ISA/237 form (Written Opinion of the International Searching Authority) (dated May 9, 2017 (Year: 2017).*
(Continued)

*Primary Examiner* — William J Klimowicz
(74) *Attorney, Agent, or Firm* — Nath, Goldberg & Meyer; Jerald L. Meyer; Stanley N. Protigal (57) ABSTRACT

A magnet structure includes first and second magnet units. The first magnet unit is provided with a first magnet fixing section that includes a first surface and a first magnet having a first polarity on the first surface's side. The second magnet unit is provided with a second magnet fixing section that includes a second surface and a second magnet having a second polarity on the second surface's side, the second polarity being an opposite polarity to the first polarity. The first and second surfaces are located next to one another on the same plane to form a magnetic attachment surface which is magnetically attached to a magnetically-attached object. The second magnet unit is supported by the first magnet unit so as to move in a predetermined range.

4 Claims, 8 Drawing Sheets

(56) References Cited

FOREIGN PATENT DOCUMENTS

| JP | 8249770 | A |   | 9/1996 |            |
|----|---------|---|---|--------|------------|
| JP | 991815  | A |   | 4/1997 |            |
| JP | 2011222077 | A | * | 11/2011 |           |
| JP | 2013232643 | A |   | 11/2013 |           |
| KR | 20030048688 | A | * | 6/2003 | ......... G11B 17/0284 |

OTHER PUBLICATIONS

Japanese Document 61-153160 U, published Sep. 22, 1986 (Year: 1986).*
Japanese Document 4-13783 Y2, published Mar. 30, 1992 (Year: 1992).*
ISA 237 dated Sep. 5, 2017 corresponding to International Application No. PCT/JP2017/022779.

* cited by examiner

MAGNET STRUCTURE, CLAMPING MECHANISM, AND OPTICAL DISC APPARATUS

CROSS REFERENCE TO RELATED APPLICATION

This application is a Continuation of PCT Application No. PCT/JP2017/022779, filed on Jun. 21, 2017, and claims the priority of Japanese Patent Application No. 2016-180350 filed on Sep. 15, 2016, the entire contents of both of which are incorporated herein by reference.

BACKGROUND

The present disclosure relates to a magnet structure, a clamping mechanism, and an optical disc apparatus.

When a magnet structure is magnetically attached to a magnetically-attached object with a non-magnetic body interposed therebetween, the non-magnetic body is fixed to the magnetically-attached object. For example, in an optical disc apparatus, when a clamper (which is a magnet structure) is magnetically attached to a turntable (which is a magnetically-attached object) with an optical disc (which is a non-magnetic body) interposed therebetween, the optical disc is fixed to the turntable.

By increasing the magnetic attachment force of the magnet structure, the non-magnetic body can be fixed to the magnetically-attached object more reliably. For example, in an optical disc apparatus, recording and reproduction for optical discs require high-speed transfer of information. This needs high speed rotation of optical discs. In order to rotate an optical disc at a high speed, it is important to increase the force holding an optical disc. The force holding an optical disc can be increased by increasing the magnetic attachment force of the clamp.

To detach the non-magnetic body the from magnetically-attached object, the magnet structure needs to be separated from the magnetically-attached object with a force greater than the magnetic attachment force of the magnet structure. If the magnetic attachment force of the magnet structure is increased, therefore, greater force is required to separate the magnet structure. Japanese Unexamined Patent Application Publication No. 9-91815 (Patent Literature 1) discloses an optical disc apparatus including an assist circuit that instantaneously produces high torque to separate the clamp from the turntable.

SUMMARY

However, the circuit of the optical disc apparatus disclosed in Patent Literature 1 is complicated because of the circuit configuration including the assist circuit. In addition, it is necessary to increase the power capacity of the motor used to separate the clamp from the turntable.

A first aspect of one or more embodiments provides a magnet structure including: a first magnet unit provided with a first magnet fixing section that includes a first surface and a first magnet having a first polarity on the first surface's side; and a second magnet unit provided with a second magnet fixing section that includes a second surface and a second magnet having a second polarity on the second surface's side, the second polarity being an opposite polarity to the first polarity, wherein the first surface and the second surface are located next to one another on a same plane to form a magnetic attachment surface which is magnetically attached to a magnetically-attached object, and the second magnet unit is supported by the first magnet unit so as to move in a predetermined range.

A second aspect of one or more embodiments provides a lamping mechanism including: a magnet structure; and a magnetically-attached object to which the magnetic structure is magnetically attached, wherein the magnet structure includes: a first magnet unit provided with a first magnet fixing section that includes a first surface and a first magnet having a first polarity on the first surface's side; and a second magnet unit provided with a second magnet fixing section that includes a second surface and a second magnet having a second polarity on the second surface's side, the second polarity being an opposite polarity to the first polarity, and the first surface and the second surface are located next to one another on a same plane to form a magnetic attachment surface which is magnetically attached to a magnetically-attached object, and the second magnet unit is supported by the first magnet unit so as to move in a predetermined range.

A third aspect of one or more embodiments provides an optical disc apparatus including: a magnet structure; a turntable to which the magnetic structure is magnetically attached; a turntable driver that drives and rotates the turntable; a turntable driving circuit that controls the turntable driver; a clamp support which supports the magnet structure; a clamp driver which drives the clamp support away from and toward the turntable; and a clamp driving circuit which controls the clamp driver to move the magnet structure away from and toward the turntable, wherein the magnet structure includes: a first magnet unit provided with a first magnet fixing section that includes a first surface and a first magnet having a first polarity on the first surface's side; and a second magnet unit provided with a second magnet fixing section that includes a second surface and a second magnet having a second polarity on the second surface's side, the second polarity being an opposite polarity to the first polarity, and the first surface and the second surface are located next to one another on a same plane to form a magnetic attachment surface which is magnetically attached to a magnetically-attached object, and the second magnet unit is supported by the first magnet unit so as to move in a predetermined range.

DETAILED DESCRIPTION

Figure 1:
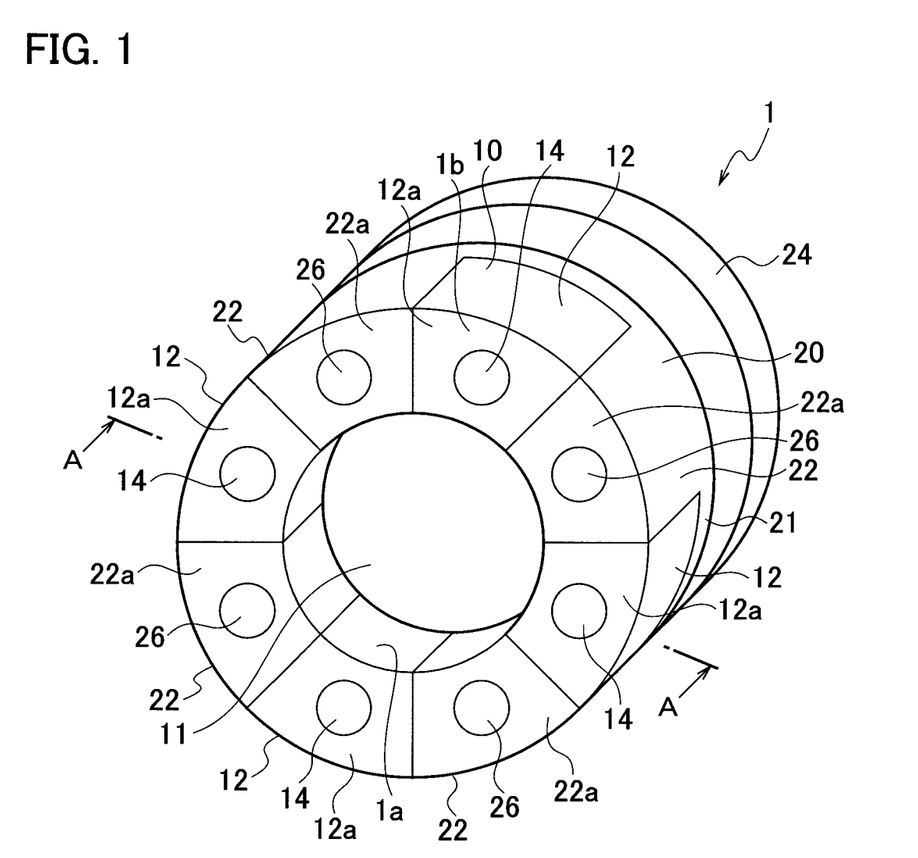
FIG. 1 is a perspective view illustrating a magnet structure according to one or more embodiments.
Figure 2:
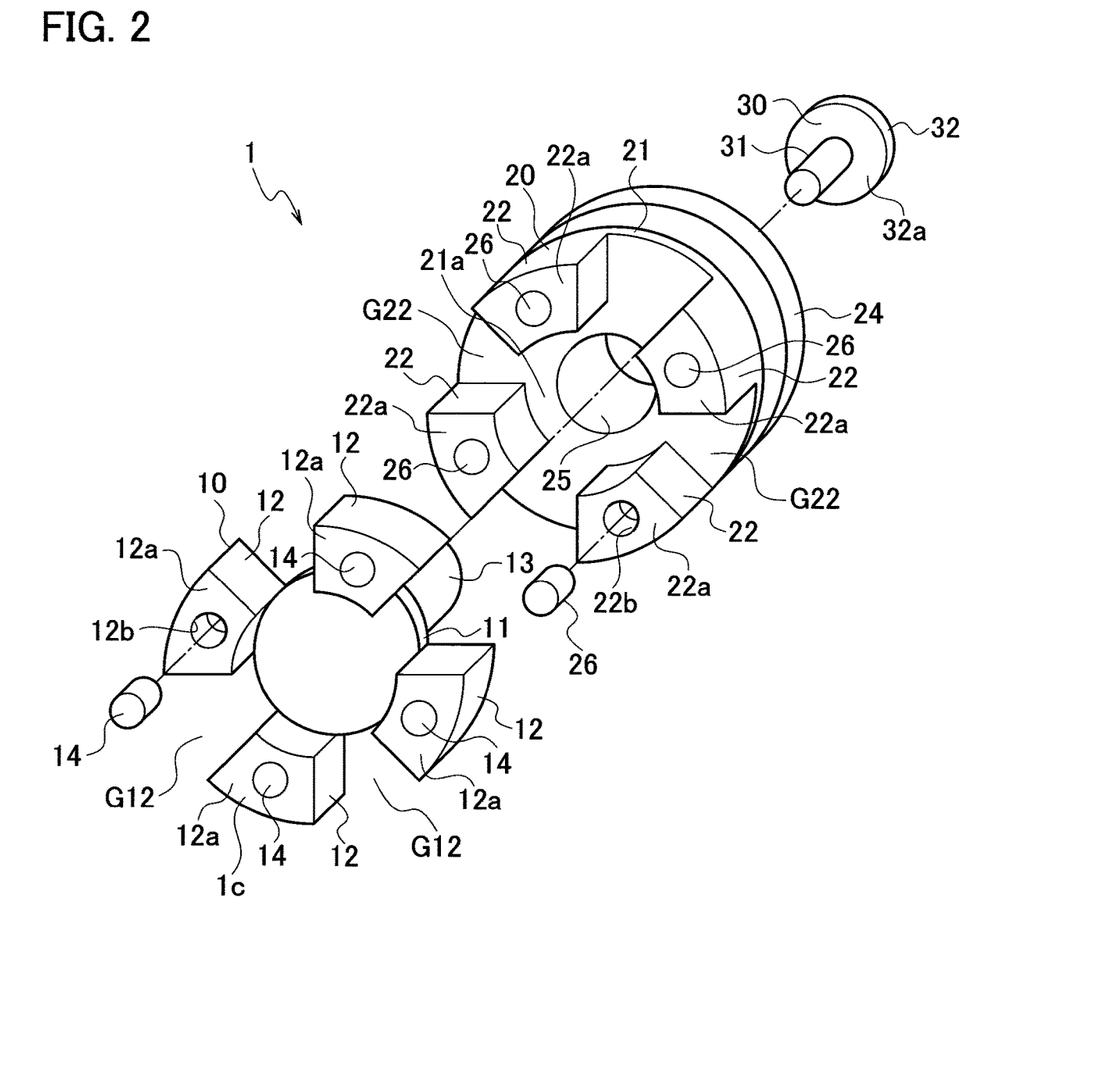
FIG. 2 is an exploded view of the magnet structure according to one or more embodiments.
Figure 3A:
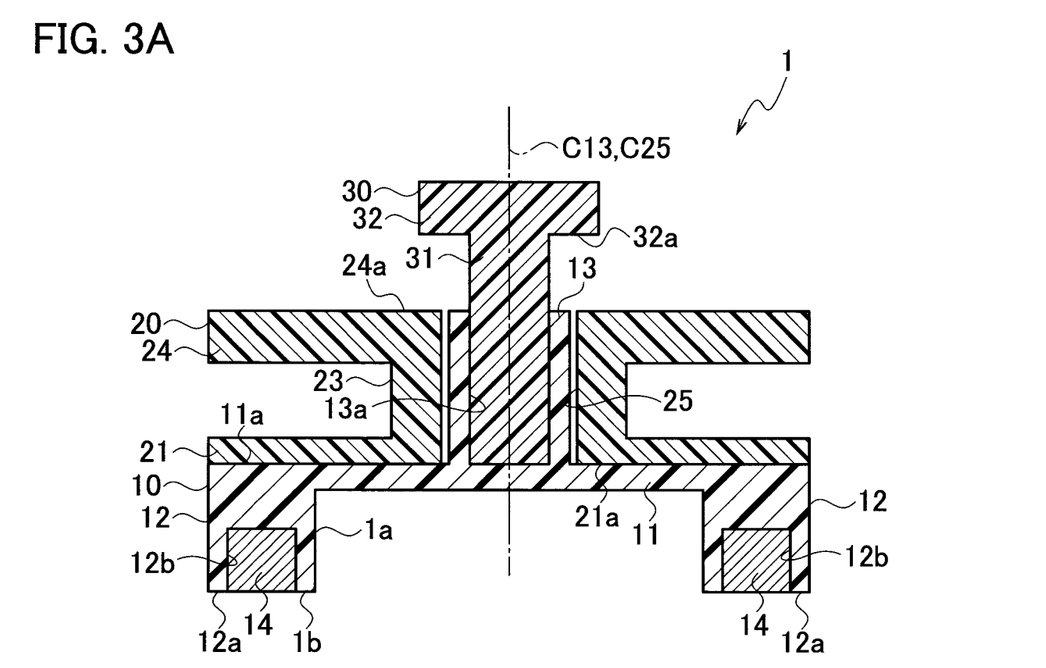
FIG. 3A is a cross-sectional view of the magnet structure according to one or more embodiments taken along a line A-A of FIG. 1, illustrating the state where contact surfaces of first and second magnet units are in contact.
Figure 3B:
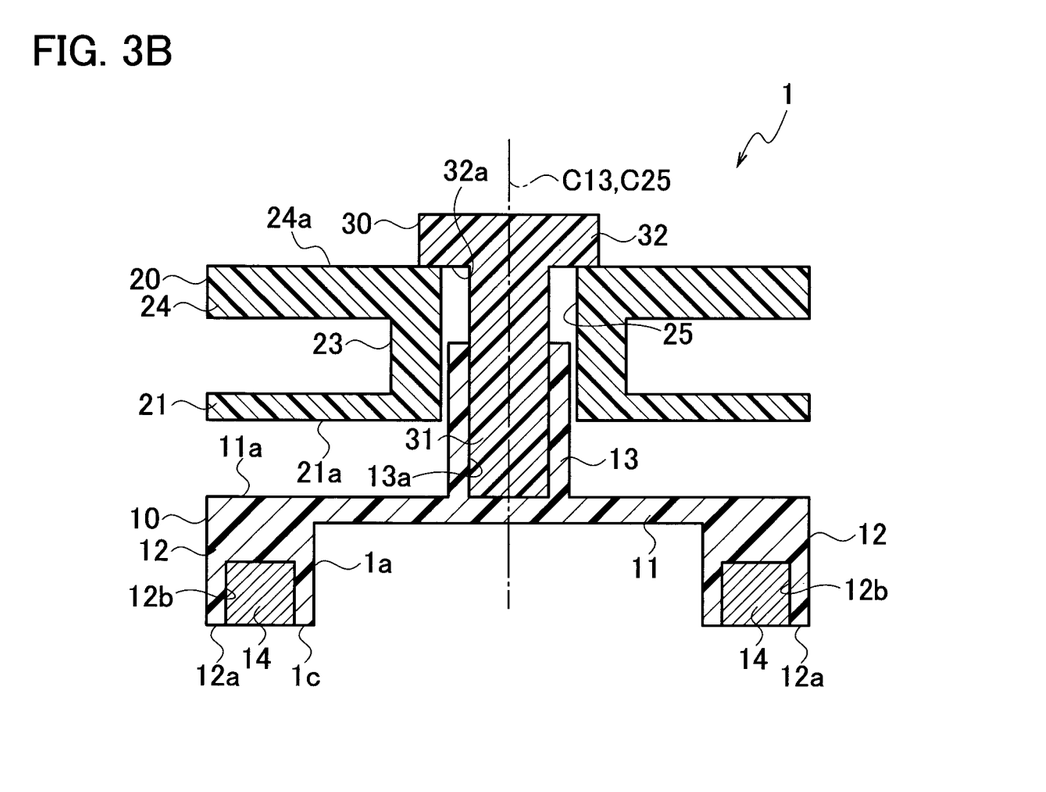
FIG. 3B is a cross-sectional view of the magnet structure according to one or more embodiments taken along the line A-A of FIG. 1, illustrating the state where the contact surfaces of the first and second magnet units are separate from each other.

A description is given of a configuration example of a magnet structure according to one or more embodiments using FIGS. 1, 2, 3A, and 3B. FIG. 1 illustrates a magnet structure 1 according to one or more embodiments, seen from the side of a magnetic attachment surface 1b. FIG. 2 illustrates an exploded view of constituent components of the magnetic structure 1. FIGS. 3A and 3B illustrate the cross-section of the magnet structure 1 taken along a line A-A of FIG. 1.

The magnet structure 1 includes a first magnet unit 10, a second magnet unit 20, and a stopper 30. At the center of the magnet structure 1 on the magnetic attachment surface 1b side, a recess 1a is formed. The recess 1a is cylindrical, for example.

The first magnet unit 10 includes a support plate 11, a plurality of magnet fixing sections 12 (a first magnet fixing section), and a stopper fixing section 13. The support plate 11 is disc-shaped, for example. The first magnet unit 10 is made of resin or ceramic, for example.

The plurality of magnet fixing sections 12 are arranged with gaps G12 therebetween and are fixed to the support plate 11. Each of the magnet fixing sections 12 includes a first surface 12a, a hole 12b, and a permanent magnet 14 (a first magnet). The hole 12b is formed in the first surface 12a side of the magnet fixing section 12. The permanent magnet 14 is embedded in the hole 12b and has a first polarity on the first surface 12a side (the first surface 12a side is the north pole, for example). The end face of the permanent magnet 14 is desirably flush with the first surface 12a. The permanent magnet 14 may be a neodymium magnet.

The stopper fixing section 13 includes a hole 13a. The stopper fixing section 13 is cylindrical, for example. The stopper fixing section 13 is fixed to a contact surface 11a of the support plate 11, which is on the other side from the first surfaces 12a, so that a central axis C13 of the stopper fixing section 13 (hole 13a) is vertical to the first surfaces 12a.

The second magnet unit 20 includes a support plate 21, a plurality of magnet fixing sections 22 (a second magnet fixing section), a body 23, a flange 24, and a through-hole 25. The support plate 21 is disc-shaped, for example. The second magnet unit 20 is made of resin or ceramic, for example.

The plurality of magnet fixing sections 22 are arranged with gaps G22 therebetween and are fixed on the contact surface 21a side of the support plate 21, which faces the contact surface 11a. Each of the magnet fixing sections 22 includes a second surface 22a, a hole 22b, and a permanent magnet 26 (a second magnet). The hole 22b is formed in the second surface 22a side of the magnet fixing section 22.

The permanent magnet 26 is embedded in the hole 22b and has a second polarity, which is the opposite polarity to the first polarity, on the second surface 22a side (the second surface 22a side is the south pole, for example). The permanent magnets 26 desirably have magnetic force equal to that of the permanent magnets 14. The end face of each permanent magnet 26 is desirably flush with the corresponding second surface 22a. The permanent magnet 26 may be a neodymium magnet.

The body 23 connects the support plate 21 and the flange 24. The through-hole 25 penetrates the support plate 21, body 23, and flange 24. The through-hole 25 is formed so that a central axis C25 is vertical to the second surfaces 22a. The through-hole 25 has an inner diameter slightly (about 0.1 mm, for example) greater than the outer diameter of the stopper fixing section 13.

The flange 24 is ring-shaped, for example. The surface of the flange 24 on the opposite side to the body 23 is a contact surface 24a, which comes into contact with the stopper 30. The body 23 is cylindrical, for example. The outer diameter of the flange 24 is greater than that of the body 23.

The stopper 30 includes a shaft 31 and a flange 32. The shaft 31 is columnar, for example. The outer diameter of the shaft 31 is substantially equal to the inner diameter of the hole 13a of the stopper fixing section 13. The flange 32 is disc-shaped, for example. The surface of the flange 32 on which the shaft 31 is formed is a contact surface 32a, which comes into contact with the contact surface 24a of the flange 24. The stopper fixing section 13 of the first magnet unit 10 is inserted into the through-hole 25 of the second magnet unit 20 so that the magnet fixing sections 22 are located in the respective gaps G12 between the magnet fixing sections 12 while the magnet fixing sections 12 are located in the respective gaps G22 between the magnet fixing sections 22. The stopper 30 is connected to the first magnet unit 10 with the shaft 31 fitted into the hole 13a of the stopper fixing section 13.

The second magnet unit 20 is supported by the stopper fixing section 13 so as to freely move between the first magnet unit 10 and stopper 30. Specifically, the second magnet unit 20 moves between such a position that the contact surface 21a comes into contact with the contact surface 11a of the first magnet unit 10 and such a position that the contact surface 24a comes into contact with the contact surface 32a of the stopper 30.

FIG. 3A illustrates the state where the contact surface 21a of the second magnet unit 20 and the contact surface 11a of the first magnet unit 10 are in contact. FIG. 3B illustrates the state where the contact surfaces 21a and 11a are not in contact, or specifically the state where the contact surface 24a of the second magnet unit 20 and the contact surface 32a of the stopper 30 are in contact. The range of movement of the second magnet unit 20 is thus limited by the contact surface 11a of the first magnet unit 10 and the contact surface 32a of the stopper 30.

When the contact surface 11a of the first magnet unit 10 and the contact surface 21a of the second magnet unit 20 are in contact, the magnet structure 1 provides a structure in which the magnet fixing sections 12 of the first magnet unit 10 and the magnet fixing sections 22 of the second magnet unit 20 are alternately arranged next to one another, as illustrated in FIG. 1. In the magnet structure 1, the first surfaces 12a of the first magnet unit 10 and the second surfaces 22a of the second magnet unit 20 are alternately arranged next to one another on the same plane to form a magnetic attachment surface 1b, which is magnetically attached to a magnetically-attached object. A total of eight permanent magnets 14 and 26 are arranged on the magnetic attachment surface 1b. The permanent magnets 14 and 26 are preferably arranged alternately at regular intervals on the same circle.

On the other hand, when the contact surfaces 11a and 21a are not in contact, as illustrated in FIGS. 2 and 3A, the first surfaces 12a of the first magnet unit 10 form a magnetic attachment surface 1c, which is magnetically attached to the magnetically-attached object. Four permanent magnets 14 arranged on the magnetic attachment surface 1c. The magnetic attachment force due to the magnet structure 1 is therefore smaller in the magnetic attachment surface 1c than that in the magnetic attachment surface 1b.

When the magnet structure 1 is magnetically attached to a magnetically-attached object, the magnetic attachment surface 1b or 1c is magnetically attached to the magnetically-attached object. When the magnet structure 1 is magnetically attached to the magnetically-attached object with a non-magnetic body interposed therebetween, the magnetic attachment surface 1b or 1c is in contact with the non-magnetic body to be magnetically attached to the magnetically-attached object.

Figure 4:
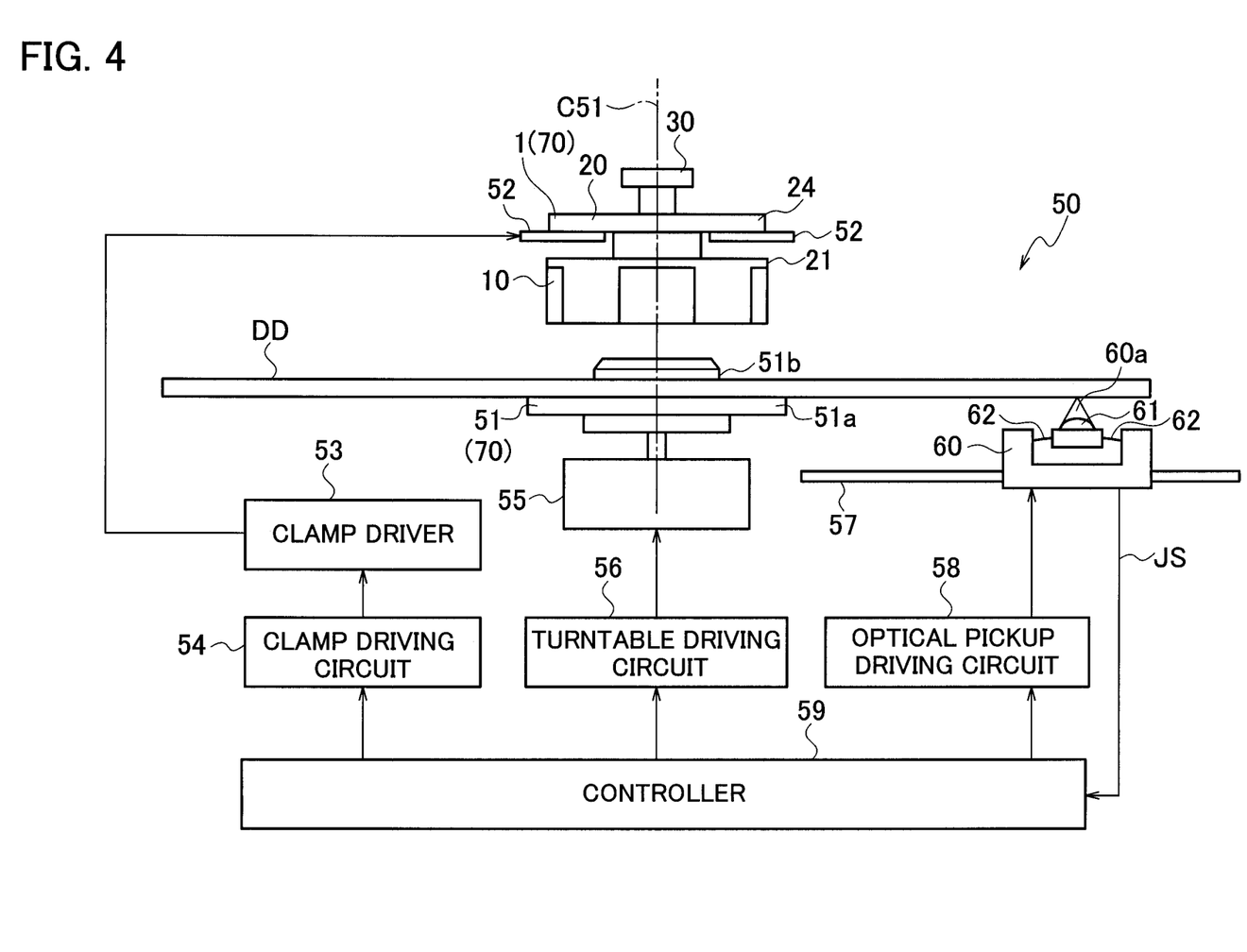
FIG. 4 is a configuration diagram illustrating a clamping mechanism and an optical disc apparatus according to one or more embodiments.

Using FIG. 4, a description is given of a configuration example of a clamping mechanism including the magnet structure 1 and an optical disc apparatus including the clamping mechanism. An optical disc apparatus 50 includes the magnet structure 1 functioning as a clamper, a turntable 51, a clamp support 52, a clamp driver 53, a clamp driving circuit 54, a turntable driver 55, a turntable driving circuit 56, a guide shaft 57, an optical pickup 60, an optical pickup driving circuit 58, and a controller 59.

The turntable 51 (which is the magnetically-attached object) includes: a table 51a, on which an optical disc DD (which is the non-magnetic body) is placed; and a protrusion 51b for positioning of the optical disc DD. The optical disc DD is positioned by the protrusion 51b to be placed on the table 51a.

The clamp support 52 is located in a gap between the support plate 21 of the second magnet unit 20 and the flange 24 in the magnet structure 1. The clamp support 52 supports the flange 24 to support the magnet structure 1.

The clamp driver 53 drives the clamp support 52 in a direction away from the turntable 51 (upward in FIG. 4) and a direction toward the turntable 51 (downward in FIG. 4). The clamp driver 53 may be a motor, for example.

The clamp driving circuit 54 controls the clamp driver 53. The clamp driving circuit 54 controls the clamp driver 53 so that the clamp support 52 is located at a predetermined height. The clamp driving circuit 54 controls the clamp driver 53 so as to move the magnet structure 1 away from or toward the turntable 51 and optical disc DD.

When the magnet structure 1 is driven downward, the optical disc DD is held on the turntable 51 with the magnetic attachment force due to the magnet structure 1 and turntable 51. The magnet structure 1 and turntable 51 constitute a clamping mechanism 70 holding the optical disc DD.

The turntable driver 55 drives and rotates the turntable 51 together with the optical disc DD and magnetic structure 1. The turntable driver 55 may be a spindle motor, for example. The turntable driving circuit 56 controls the turntable driver 55. The turntable driving circuit 56 controls the turntable driver 55 so that the turntable 51 rotates together with the optical disc DD and magnet structure 1 at a constant linear velocity, for example.

The guide shaft 57 is arranged parallel to the optical disc DD along the radial direction of the optical disc DD. That is, the guide shaft 57 is extended along the direction perpendicular to a rotation axis C51 of the turntable 51. The optical pickup 60 is supported by the guide shaft 57. The optical pickup 60 is driven along the guide shaft 57, in the radial direction of the optical disc DD and parallel to the optical disc DD. The optical pickup 60 is thus driven in the direction perpendicular to the rotation axis C51 of the turntable 51. The optical pickup 60 includes an objective lens 61. The objective lens 61 is supported by a suspension wire 62. The objective lens 61 is driven in the direction toward the optical disc DD (upward in FIG. 4) and in the direction away from the optical disc DD (downward in FIG. 4). The optical pickup 60 projects a laser beam 60a toward the optical disc DD. The laser beam 60a is collected onto the optical disc DD through the objective lens 61.

The optical pickup 60 receives reflected light from the optical disc DD and outputs information data JS recorded in the optical disc DD, to the controller 59. The optical pickup driving circuit 58 controls driving of the optical pickup 60. The optical pickup driving circuit 58 moves the optical pickup 60 along the guide shaft 57 or moves the objective lens 61 of the optical pickup 60 up and down, for example. The controller 59 controls the clamp driving circuit 54, the turntable driving circuit 56, and the optical pickup driving circuit 58. The controller 59 may be a central processing unit (CPU), for example.

Figure 5:
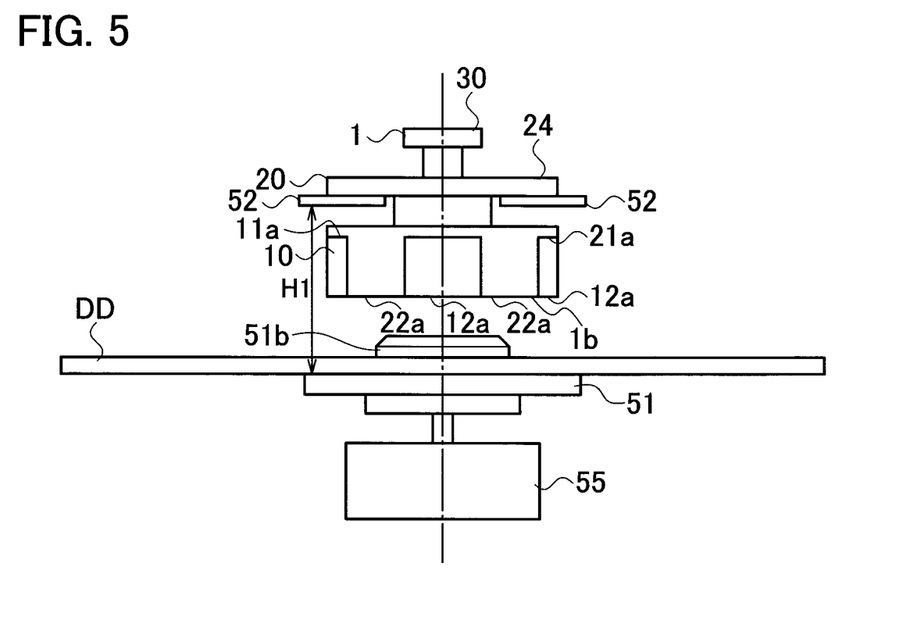
FIG. 5 is a partially enlarged view of FIG. 4, illustrating an initial state of the magnet structure according to one or more embodiments.

Using FIGS. 5 to 9, the operation of the magnet structure 1 is described. FIG. 5 illustrates the initial state where the magnet structure 1 is located at a reference position. Herein, the distance between the turntable 51 and the clamp support 52 is H1. In the initial state, the magnetic attachment force due to the magnet structure 1 acting on the turntable 51 is smaller than the magnetic force with which the permanent magnets 14 of the first magnet unit 10 and the permanent magnets 26 of the second magnet unit 20 attract each other.

For that reason, the permanent magnets 14 and 26 are the closest to each other, that is, the contact surface 11a of the first magnet unit 10 and the contact surface 21a of the second magnet unit 20 are in contact. In the initial state, the magnet structure 1 then forms the magnetic attachment surface 1b, where the first surfaces 12a of the first magnet unit 10 and the second surfaces 22a of the second magnet unit 20 are alternately arranged next to one another on the same plane.

Figure 6:
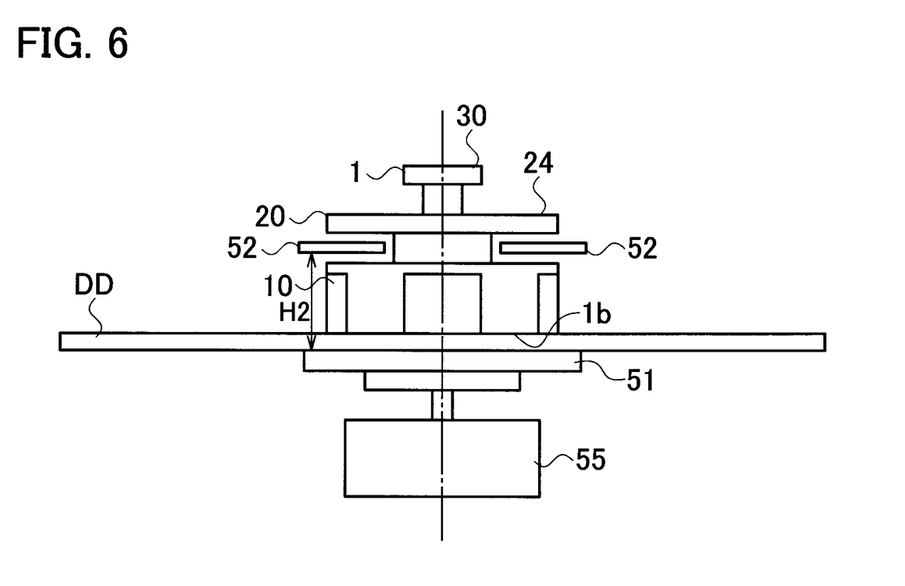
FIG. 6 is a partially enlarged view of FIG. 4, illustrating a clamping state of the magnet structure according to one or more embodiments.

FIG. 6 illustrates a clamping state where the clamp support 52 is moved close to the turntable 51 so that the distance between the clamp support 52 and the turntable 51 is H2 (H2<H1). In the clamping state, the magnet structure 1 is positioned so that the recess 1a accommodates the protrusion 51b of the turntable 51 and the magnetic attachment surface 1b is in contact with the optical disc DD. In the clamping state, the clamp support 52 is not in contact with the magnet structure 1.

In the clamping state, magnetic forces of both the permanent magnets 14 of the first magnet unit 10 and the permanent magnets 26 of the second magnet unit 20 act on the turntable 51. This produces a large magnetic attachment force in the magnetic attachment surface 1b of the magnet structure 1. The optical disc DD is held on the turntable 51 with the large magnetic attachment force of the magnet structure 1. In the clamping state, the turntable 51 is driven and rotated together with the optical disc DD and the magnetic structure 1.

Figure 7:
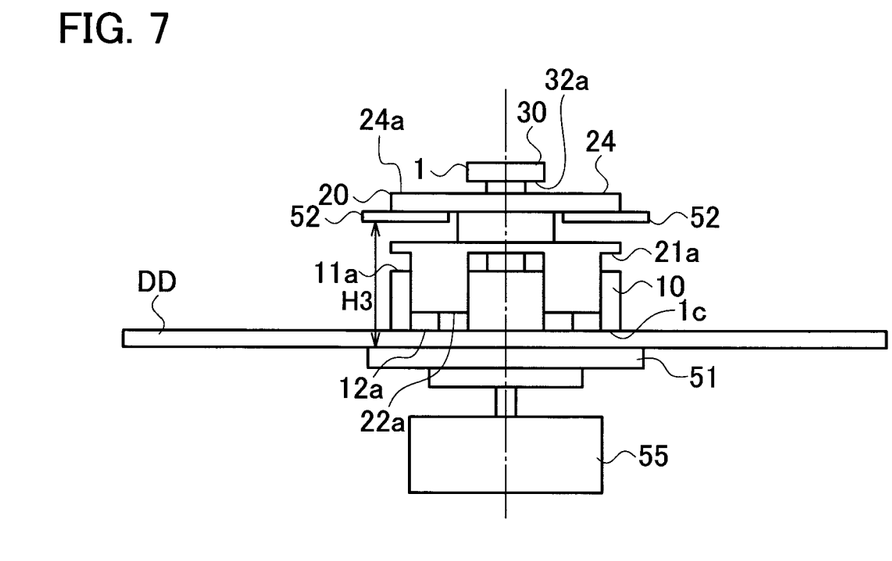
FIG. 7 is a partially enlarged view of FIG. 4, illustrating an intermediate separating state of the magnet structure according to one or more embodiments.

FIG. 7 illustrates an intermediate separating state where the clamp support 52 is slightly moved away from the turntable 51, out of the clamping state, so that the distance between the clamp support 52 and the turntable 51 is H3

(H2<H3<H1). The second magnet unit 20 is supported by the clamp support 52 and is separated from the optical disc DD.

In the intermediate separating state, the magnetic attachment force due to the magnet structure 1 acting on the turntable 51 is greater than the magnetic force with which the permanent magnets 14 of the first magnet unit 10 and the permanent magnets 26 of the second magnet unit 20 attract each other. The magnet structure 1 is therefore positioned so that the magnetic attachment surface 1c, which is composed of only the first surfaces 12a of the first magnet unit 10, is in contact with the optical disc DD while the second surfaces 22a of the second magnet unit 20 are separated from the optical disc DD. That is, only the second magnet unit 20 is separated from the optical disc DD.

Therefore, the clamp support 52 is able to separate the second magnet unit 20 from the optical disc DD with a smaller force than the force necessary to separate the entire magnet structure 1. In the intermediate separating state, the magnet structure 1 is positioned so that the contact surface 21a of the second magnet unit 20 and the contact surface 11a of the first magnet unit 10 are not in contact while the contact surface 24a of the second magnet unit 20 and the contact surface 32a of the stopper 30 are not in contact.

The magnetic force of the permanent magnets 14 of the first magnet unit 10 is the major magnetic force acting on the turntable 51. The optical disc DD is thus held on the turntable 51 with a smaller magnetic attachment force than that in the clamping state of the magnet structure 1. The magnetic force of the permanent magnets 26 of the second magnet unit 20 slightly acts on the turntable 51.

Figure 8:
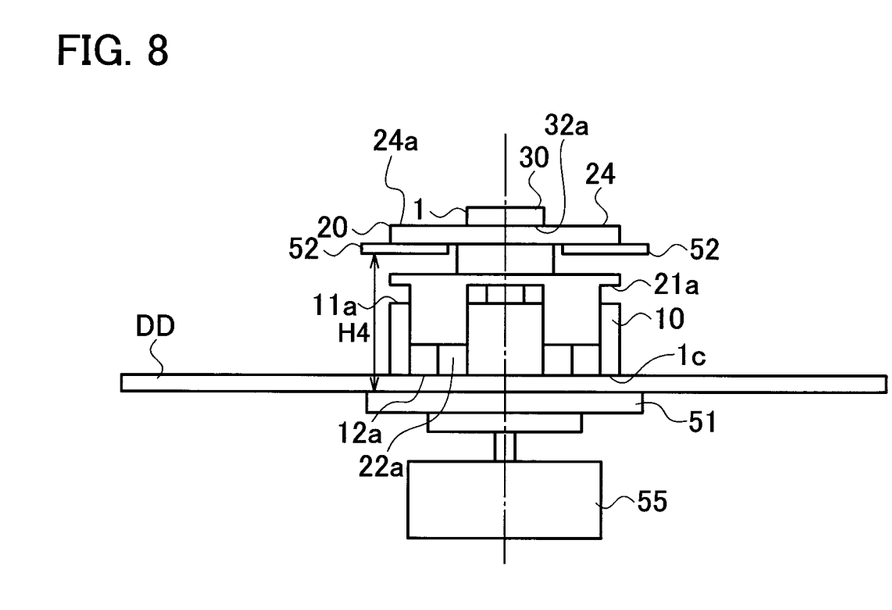
FIG. 8 is a partially enlarged view of FIG. 4, illustrating a first separate state of the magnet structure according to one or more embodiments.

FIG. 8 illustrates a first separate state where the clamp support 52 is further moved away from the turntable 51, out of the intermediate separating state, so that the distance between the turntable 51 and the clamp support 52 is H4 (H2<H3<H4<H1). Herein, the contact surface 24a of the second magnet unit 20 and the contact surface 32a of the stopper 30 are in contact.

In the first separate state, the contact surface 24a of the second magnet unit 20 and the contact surface 32a of the stopper 30 are in contact, so that the entire magnet structure 1 is supported by the clamp support 52. In the first separate state, the magnetic force of the first magnet unit 10 acting on the turntable 51 is greater than the magnetic force with which the permanent magnets 14 of the first magnet unit 10 and the permanent magnets 26 of the second magnet unit 20 attract each other.

The magnet structure 1 therefore maintains the state where the magnetic attachment surface 1c, which is composed of only the first surfaces 12a of the first magnet unit 10, is in contact with the optical disc DD while the second surfaces 22a of the second magnet unit 20 are separated from the optical disc DD, that is, the state where only the second magnet unit 20 is separated from the optical disc DD.

The second magnet unit 20 is more distant from the turntable 51 in the first separate state than in the intermediate separating state. The optical disc DD is therefore held on the turntable 51 with a smaller magnetic attachment force than that in the intermediate separating state of the magnet structure 1.

Figure 9:
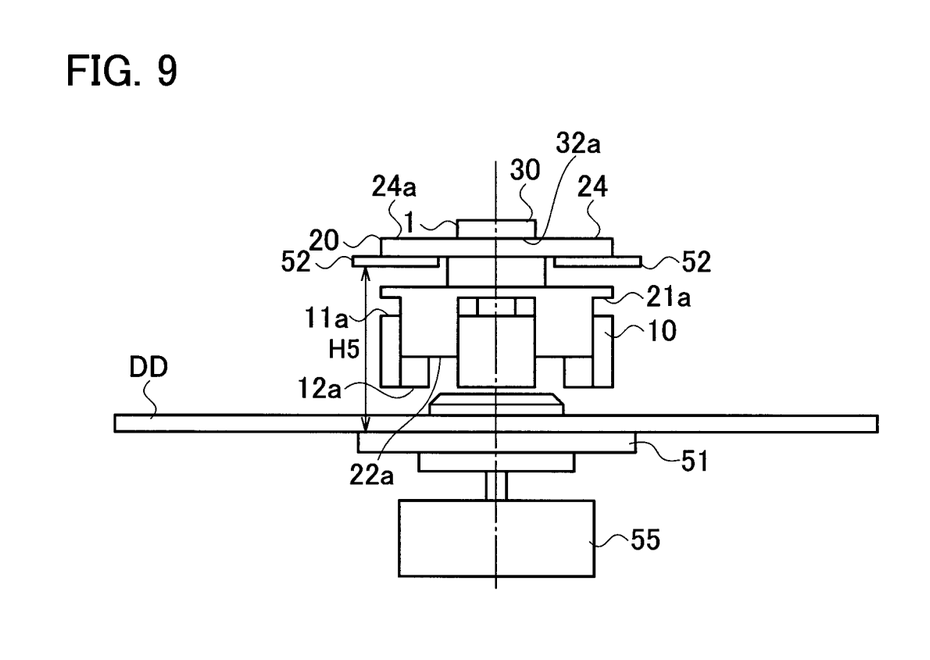
FIG. 9 is a partially enlarged view of FIG. 4, illustrating a second separate state of the magnet structure according to one or more embodiments.

FIG. 9 illustrates a second separate state where the clamp support 52 is further moved away from the turntable 51, out of the first separate state, so that the distance between the turntable 51 and the clamp support 52 is H5 (H2<H3<H4<H5<H1). In the second separate state, the first magnet unit 10 is separated from the optical disc DD.

In the first separate state, the magnetic force of the first magnet unit 10 is the major magnetic force acting on the turntable 51. In the second separate state, therefore, the clamp support 52 is able to separate the first magnet unit 10 from the optical disc DD with a smaller force than the force necessary to separate the entire magnet structure 1.

In the process of further moving the clamp support 52 away from the turntable 51, out of the second separate state into the initial state, the magnetic force with which the permanent magnets 14 of the first magnet unit 10 and the permanent magnets 26 of the second magnet unit 20 attract each other increases beyond the magnetic attachment force of the first magnet unit 10 acting on the turntable 51.

In the initial state, the magnet structure 1 is therefore returned to the state where the permanent magnets 14 and 26 attract each other to be the closest to each other, that is, the state where the contact surface 11a of the first magnet unit 10 and the contact surface 21a of the second magnet unit 20 are in contact. The magnet structure 1 is therefore positioned so that the first surfaces 12a of the first magnet unit 10 and the second surfaces 22a of the second magnet unit 20 are alternately arranged next to one another on the same plane to form the magnetic attachment surface 1b. When the magnet structure 1 is brought into the clamping state, the magnetic attachment surface 1b of the magnet structure 1 is in contact with the optical disc DD, so that the optical disc DD is centered with a high degree of accuracy.

According to the aforementioned magnet structure 1, the clamping mechanism 70, and the optical disc apparatus 50, the magnet structure 1 comes into contact with a non-magnetic body (the optical disc DD or the like) through the magnetic attachment surface 1b, where the first surfaces 12a of the first magnet unit 10 and the second surfaces 22a of the second magnet unit 20 are alternately arranged next to one another on the same plane. The magnetic forces of the permanent magnets 14 of the first magnet unit 10 and the permanent magnets 26 of the second magnet unit 20 both act on the magnetically-attached object, allowing the non-magnetic body to be held on the magnetically-attached object with the large magnetic attachment force of the magnet structure 1.

In the process of separating the magnet structure 1 from the magnetically-attached object, the second magnet unit 20 is first separated from the magnetically-attached object, and the first magnet unit 10 is then separated from the magnetically-attached object. This allows the magnet structure 1 to be separated from the magnetically-attached object with a smaller force than the magnetic attachment force of the entire magnet structure 1.

According to the magnet structure 1, the clamping mechanism 70, and the optical disc apparatus 50, the magnet structure 1 is easily separated from the magnetically-attached object without an assist circuit that produces high torque as disclosed in Patent Literature 1, even when the magnet structure 1 provides large magnetic attachment force. In the optical disc apparatus 50, the magnet structure 1 is separated from the optical disc DD and the turntable 51 with a small force, for example. This reduces power consumption of the clamp driver 53 or reduces the power capacity of the motor constituting the clamp driver 53.

The present invention is not limited to the configuration of the aforementioned embodiment and can be variously changed without departing from the scope of the present invention. In the aforementioned embodiment, the total of eight permanent magnets 14 and 26 are arranged on the magnetic attachment surface 1b in order to increase the magnetic attachment force of the magnet structure 1, for example. The number, material, size, and shape of the permanent magnets 14 and 26 are properly determined to implement intended magnetic attachment force. In the example described in the aforementioned embodiment, the magnet structure 1 is used in the clamper of the optical disc apparatus. In addition to such clampers, the magnet structure 1 is applicable to usages in which the magnet structure 1 is magnetically attached to the magnetically-attached object or magnetically attached to the magnetically-attached object with the non-magnetic body interposed therebetween. For example, the magnet structure 1 is magnetically attached to a wall (which is the magnetically-attached object) with a piece of paper (which is the non-magnetic body) interposed therebetween to fix the piece of paper on the wall.

First Modified Example

Figure 10:
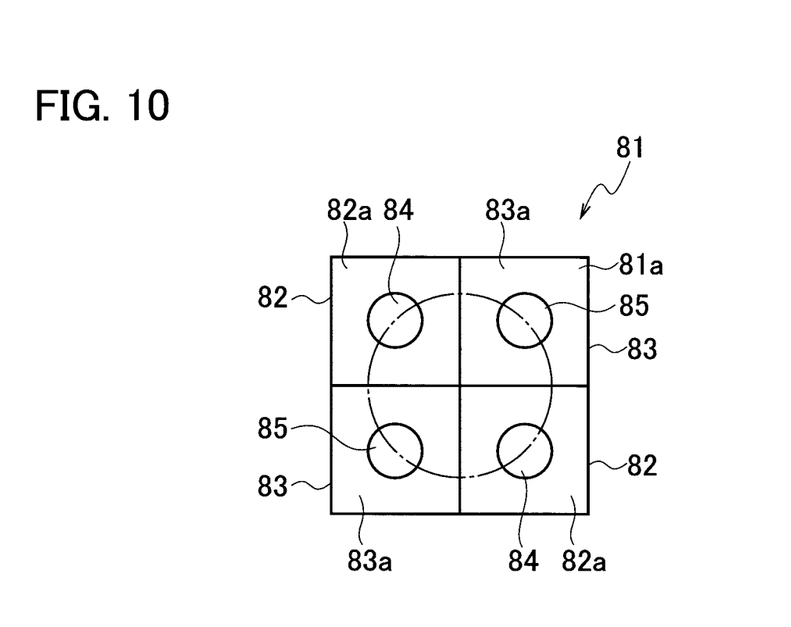
FIG. 10 is a configuration diagram illustrating a magnet structure of a first modified example.

As illustrated in FIG. 10, a magnetic attachment surface 81a of the magnet structure 81 may be composed of third surfaces 82a of third magnet units 82 and fourth surfaces 83a of fourth magnet units 83. A magnetic attachment surface 81a of the magnet structure 81 corresponds to the magnetic attachment surface 1b of the magnet structure 1. The third magnet units 82a of the third magnet units 82 correspond to the first surfaces 12a of the first magnet unit 10. The fourth surfaces 83a of the fourth magnet units 83 correspond to the second surfaces 22a of the second magnet unit 20.

Preferably, permanent magnets 84 of the third magnet units 82 and permanent magnets 85 of the fourth magnet units 83 are alternately arranged at regular intervals on the same circle. Each permanent magnet 84 is positioned with a first polarity on the third surface 82a side (the third surface 82a side is the north pole, for example). Each permanent magnet 85 is positioned with a second polarity, which is the opposite polarity to the first polarity, on the fourth surface 83a side (the fourth surface 83a side is the south pole, for example). The permanent magnets 84 and 85 desirably have equal magnetic force. The permanent magnets 84 of the third magnet units 82 correspond to the permanent magnets 14 of the first magnet unit 10. The permanent magnets 85 of the fourth magnet units 83 correspond to the permanent magnets 26 of the second magnet unit 20.

Since the magnetic forces of the permanent magnets 84 of the third magnet units 82 and the permanent magnets 85 of the fourth magnet units 83 both act on a magnetically-attached object, the non-magnetic body can be held on the magnetically-attached object with the large magnetic attachment force of the magnet structure 81.

To separate the magnet structure 81 from the magnetically-attached object, the fourth magnet units 83 are first separated from the magnetically-attached object, and the third magnet units 82 are then separated from the magnetically-attached object. This allows the magnet structure 81 to be separated from the magnetically-attached object with a smaller force than the magnetic attachment force of the entire magnet structure 81.

Second Modified Example

Figure 11:
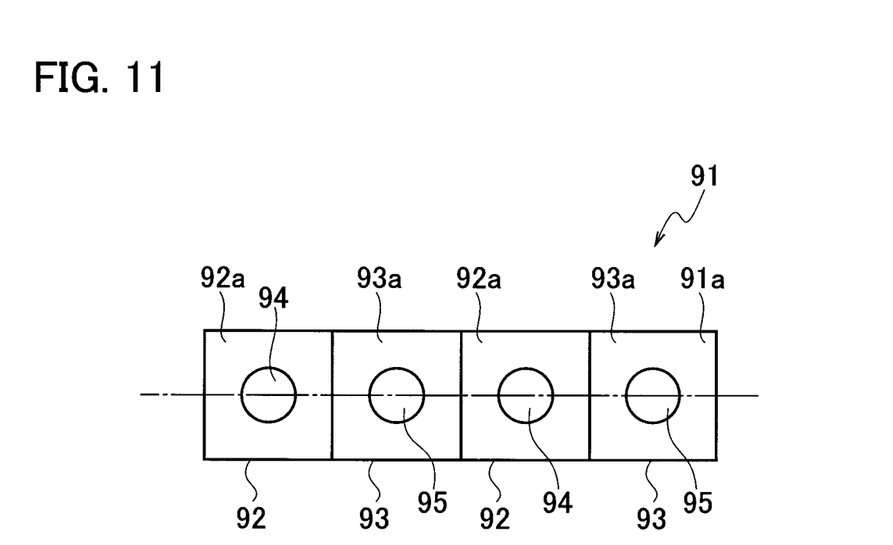
FIG. 11 is a configuration diagram illustrating a magnet structure of a second modified example.

As illustrated in FIG. 11, a magnetic attachment surface 91a of a magnet structure 91 may be composed of fifth surfaces 92a of fifth magnet units 92 and sixth surfaces 93a of sixth magnet units 93. The magnetic attachment surface 91a of the magnet structure 91 corresponds to the magnetic attachment surface 1b of the magnet structure 1. The fifth surfaces 92a of the fifth magnet units 92 correspond to the first surfaces 12a of the first magnet unit 10. The sixth surfaces 93a of the sixth magnet units 93 correspond to the second surfaces 22a of the second magnet unit 20.

Preferably, permanent magnets 94 of the fifth magnet units 92 and permanent magnets 95 of the sixth magnet units 93 are alternately arranged at regular intervals in a line. Each permanent magnet 94 is positioned with a first polarity on the fifth surface 92a side (the fifth surface 92a side is the north pole, for example). Each permanent magnet 95 is positioned with a second polarity, which is the opposite polarity to the first polarity, on the sixth surface 93a side (the sixth surface 93a side is the south pole, for example). The permanent magnets 94 and 95 desirably have equal magnetic force. The permanent magnets 94 of the fifth magnet units 92 correspond to the permanent magnets 14 of the first magnet unit 10. The permanent magnets 95 of the sixth magnet units 93 correspond to the permanent magnets 26 of the second magnet unit 20.

Since the magnetic forces of the permanent magnets 94 of the fifth magnet units 92 and the permanent magnets 95 of the sixth magnet units 93 both act on a magnetically-attached object, a non-magnetic body can be held on the magnetically-attached object with the large magnetic attachment force of the magnet structure 91.

To separate the magnet structure 91 from the magnetically-attached object, the sixth magnet units 93 are first separated from the magnetically-attached object, and the fifth magnet units 92 are then separated from the magnetically-attached object. This allows the magnet structure 91 to be separated from the magnetically-attached object with a smaller force than the magnetic attachment force of the entire magnet structure 91.

The present invention is applicable to a magnet structure that is magnetically attached to a magnetically-attached object directly or indirectly and is also applicable to clamping mechanisms and optical disc apparatuses that include the magnet structure.

What is claimed is:

1. A magnet structure comprising:
a first magnet unit provided with a first magnet fixing section that includes a first surface and a first magnet having a first polarity on the first surface's side; and
a second magnet unit provided with a second magnet fixing section that includes a second surface and a second magnet having a second polarity on the second surface's side, the second polarity being an opposite polarity to the first polarity,
wherein the first magnet unit and the second magnet unit transition between a first state and a second state, the first state being a state where the first surface and the second surface are disposed adjacent to each other on a same plane, and the first surface and the second surface form a magnetic attachment surface which is magnetically attached to a magnetically-attached object, and the second state being a state where the second magnet unit moves in a direction orthogonal to the same plane, and the first surface forms a magnetic attachment surface which is magnetically attached to a magnetically-attached object.

2. The magnet structure according to claim 1, wherein the second magnet unit includes a through-hole,
the magnet structure further comprises a stopper connected to the first magnet unit through the through-hole, and
the second magnet unit is movable between a position where the second magnet unit is in the first state and a position where the second magnet unit is in contact with the stopper and is in the second state.

3. A clamping mechanism comprising:
a magnet structure; and
a magnetically-attached object to which the magnetic structure is magnetically attached, wherein
the magnet structure comprises:
a first magnet unit provided with a first magnet fixing section that includes a first surface and a first magnet having a first polarity on the first surface's side;
a second magnet unit provided with a second magnet fixing section that includes a second surface and a second magnet having a second polarity on the second surface's side, the second polarity being an opposite polarity to the first polarity, and
the first magnet unit and the second magnet unit transition between a first state and a second state, the first state being a state where the first surface and the second surface are disposed adjacent to each other on a same plane, and the first surface and the second surface form a magnetic attachment surface which is magnetically attached to a magnetically-attached object, and the second state being a state where the second magnet unit moves in a direction orthogonal to the same plane, and the first surface forms a magnetic attachment surface which is magnetically attached to a magnetically-attached object.

4. An optical disc apparatus comprising:
a magnet structure;
a turntable to which the magnet structure is magnetically attached;
a turntable driver that drives and rotates the turntable;
a turntable driving circuit that controls the turntable driver;
a clamp support which supports the magnet structure;
a clamp driver which drives the clamp support away from and toward the turntable; and
a clamp driving circuit which controls the clamp driver to move the magnet structure away from and toward the turntable, wherein the magnet structure comprises:
a first magnet unit provided with a first magnet fixing section that includes a first surface and a first magnet having a first polarity on the first surface's side;
a second magnet unit provided with a second magnet fixing section that includes a second surface and a second magnet having a second polarity on the second surface's side, the second polarity being an opposite polarity to the first polarity; and
the first magnet unit and the second magnet unit transition between a first state and a second state, the first state being a state where the first surface and the second surface are disposed adjacent to each other on a same plane, and the first surface and the second surface form a magnetic attachment surface which is magnetically attached to a magnetically-attached object, and the second state being a state where the second magnet unit moves in a direction orthogonal to the same plane, and the first surface forms a magnetic attachment surface which is magnetically attached to a magnetically-attached object.

* * * * *